United States Patent [19]
Kipp, Jr.

[11] 4,377,258
[45] Mar. 22, 1983

[54] METHOD AND APPARATUS FOR AGITATING AND INTERMIXING AEROBIC THERMOPHILICAL COMPOSTING ORGANIC WASTE MATERIALS

[75] Inventor: Carl E. Kipp, Jr., South Charleston, Ohio

[73] Assignee: Paygro, Inc., South Charleston, Ohio

[21] Appl. No.: 247,378

[22] Filed: Mar. 25, 1981

[51] Int. Cl.$^3$ .............................................. B02C 18/16
[52] U.S. Cl. .................................. 241/27; 241/101.7; 366/345
[58] Field of Search .................. 366/343, 346; 241/27, 241/77, 101.7; 71/9; 422/224; 426/54, 55

[56] References Cited
U.S. PATENT DOCUMENTS

| | | | |
|---|---|---|---|
| 3,294,491 | 12/1966 | Brown | 422/224 |
| 3,451,799 | 6/1969 | Brown | 71/9 |
| 3,642,255 | 2/1972 | Gujer | 366/345 |
| 3,664,645 | 5/1972 | Cobey | 366/345 |
| 3,776,528 | 12/1973 | Toto | 366/345 |
| 3,881,707 | 5/1975 | Toto | 241/101.7 |
| 4,139,640 | 2/1979 | Kipp | 71/9 |

*Primary Examiner*—Edward J. McCarthy
*Attorney, Agent, or Firm*—James D. Liles

[57] ABSTRACT

A method and apparatus for more efficiently agitating and intermixing organic waste material in a containing vessel includes a rotary cutting assembly which is vertically advanced downwardly into an accumulated quantity of organic waste material. The rotary cutting assembly separates an end portion of an accumulation of material from the remainder of the material and intermixes the separated portion with ambient air. The separated portion of material is then transported to a new location in the containing vessel.

22 Claims, 10 Drawing Figures

METHOD AND APPARATUS FOR AGITATING AND INTERMIXING AEROBIC THERMOPHILICAL COMPOSTING ORGANIC WASTE MATERIALS

BACKGROUND

The present invention relates to aerobic decomposition of animal and other organic waste, such as sewage sludge, and more particularly concerns an agitating apparatus which aerates and rapidly intermixes organic material in a containing vessel.

It is known that organic waste material may be efficiently processed by providing an environment which enhances the growth of thermophilic bacteria in the waste product. One such process for aerobically decomposing organic waste material is disclosed in applicant's U.S. Pat. No. 4,139,640. According to the method in this mentioned patent, a quantity of undecomposed organic waste material is introduced into one end of an elongate composting vessel. This quantity of material is maintained in the vessel until the material attains a predetermined thermophilic temperature. This quantity of material is then agitated, intermixed and advanced to a succeeding station toward the opposite end of the vessel. The quantity of material is then once again maintained in a quiescent state until a succeeding quantity of material deposited at the end of the vessel vacated by the advanced quantity of material reaches a predetermined thermophilic temperature. Each quantity of material is repeatedly and intermittently mixingly advanced to a succeeding station and maintained in a quiescent state until the last deposited quantity reaches a predetermined thermophilic temperature. This process is continued until the quantity of material is ultimately discharged from the composting or containing vessel. Transfer of each of the quantities is achieved by way of an endless conveyor which is advanced into the bottommost level of an accumulation of organic material. The endless conveyor extracts or digs up the underside of the organic waste accumulation and advances it toward the next station.

"Digging" conveyors for aerobic decomposition vessels which are advanced into the bottommost level of an accumulation of organic material are well known in the art. For example, U.S. Pat. No. 3,451,799 discloses a conveyor which is pivotally transported by a carriage movably mounted atop a composting vessel. This pivoted conveyor is inclined to undercut an accumulation of organic waste material as the conveyor is longitudinally transported along the top of the containing vessel. A similar type of pivoted conveyor is shown in U.S. Pat. No. 3,438,740.

Another example of a "digging" conveyor is seen in U.S. Pat. No. 3,323,896. This conveyor interfaces with the organic material in a generally vertical plane. The conveyor carries elevator buckets for transporting organic material, the elevator, in turn, being carried by a carriage which is moved longitudinally atop the containing vessel. A conveyor of this general nature is also disclosed in U.S. Pat. No. 3,294,491.

While many of the prior art devices have proved to be commercially viable, they are not without their attendent disadvantages. Many of the prior art devices have, for example, been limited as to their speed of operation. Another disadvantage of the prior art devices is that they do not adequately break up and aerate the organic material as it is being advanced from one station to the next. Aeration of this type is extremely important when working with aerobic bacteria which requires oxygen.

It is thus an object of the present invention to provide an apparatus for agitating and intermixing aerobic thermophilical composting organic waste materials in a manner which intermixes the waste material with plentiful amounts of air.

It is another object of the present invention to provide an apparatus for agitating and intermixing aerobic thermophilical composted organic waste materials in a rapid and efficient manner.

It is a further object of the present invention to provide an apparatus for efficiently transferring organic waste material from one location to another in a containment vessel.

SUMMARY OF THE INVENTION

In accordance with the invention, an apparatus is provided for removing and intermixing material. The apparatus includes an open top vessel for housing the material to be intermixed. A carriage extends across the top of the vessel from one side to the other and is longitudinally movable thereon from one end to the other. This carriage rotatably supports a rotary cutting assembly which is vertically movable within the vessel during rotation of the cutting assembly. The cutting assembly serves to agitate and discharge material accumulated in the container. Transport means are proximally located with respect to the cutting assembly for receiving material discharged therefrom.

In accordance with a further aspect of the invention, the rotary cutting assembly is oscillated from one side of the vessel to the other simultaneously with being moved vertically to agitate and discharge the accumulated material. The rotary cutting assembly is preferably hangingly suspended from a support spanning the width of the open top vessel from one side to the other. At least one cylinder piston arrangement is used to vertically raise and lower the rotary cutting assembly within the containment vessel. In a more specific aspect of the invention, at least two piston cylinder arrangements are utilized to raise and lower the rotary cutter and these piston cylinder arrangements are disposed within a pair of telescoping hangers, which telescoping hangers support the rotary cutting assembly from the spanning support. The rotary cutting assembly is vertically extended and retracted with respect to the vessel in accordance to movement of the piston cylinder arrangements.

In accordance to a further aspect of the invention, the hangers are rollingly supported upon the spanning support and are rollable thereon in a direction transverse to the vessel's longitudinal direction from one side of the vessel to the other. The rotary cutting assembly preferably includes a motor drive mounted upon a support secured to a pair of secondary hangers which are telescopically extendable within primary hangers secured to the spanning support. The motor drive is operative to rotatably drive the rotary cutting assembly. The rotary cutting assembly further includes a drive sprocket driven by the drive motor, the drive sprocket being centrally disposed upon a driven shaft which rotates the cutting assembly. The cutting assembly of a preferred form of the invention, includes at least four distinct cutting sections with at least one of the distinct cutting sections being disposed on a driven shaft between each of the sidewalls of the vessel and its most proximal hanger, and at least two of the distinct sections being disposed on the driven shaft between the hangers. Most preferably, the transport means is an endless conveyor which is mounted on a carriage longitudinally movable upon the container from one end to the other and in tandum with the rotary cutting assembly. The cutting assembly further includes a plurality of cutting knives disposed upon the periphery of a hub which is rigidly affixed to and rotatable with the driven shaft.

A further aspect of the invention relates to a method of intermixing an accumulated quantity of organic waste material. This method involves accumulating a quantity of organic waste material in a vessel. Once the quantity of organic waste material is accumulated, a rotary cutting assembly is positioned above one end of the accumulated quantity. The rotary cutting assembly is then advanced downwardly into the edge of the accumulated material and the edge portion of the material is caused to separate from the remainder of the material. The separated edge portion is then intermixed with itself and the ambient air prior to being transported from the discharge location of the rotary cutting assembly to a separate but predetermined location. Most preferably, the rotary cutting assembly is then moved toward the other end of the accumulated waste material and repositioned above a newly formed edge of the organic waste material. In the most preferred method, the rotary cutting assembly is moved toward the other end of the accumulated material by a distance equal to the radius of the rotary cutting assembly. The rotary cutting assembly is then vertically advanced downwardly once again to separate and intermix the material which is once again transported to a new location.

BRIEF DESCRIPTION OF THE DRAWINGS

Other objects and advantages of the invention will become apparent upon reading the following detailed description and upon reference to the drawings, in which.

While the invention will be described in connection with a preferred embodiment and procedure, it will be understood that it is not intended to limit the invention to that embodiment or procedure. On the contrary, it is intended to cover all alternatives, modifications and equivalents as may be included within the spirit and scope of the invention as defined by the appended claims.

DETAILED DESCRIPTION OF THE PREFERRED EMBODIMENT

Figure 1:
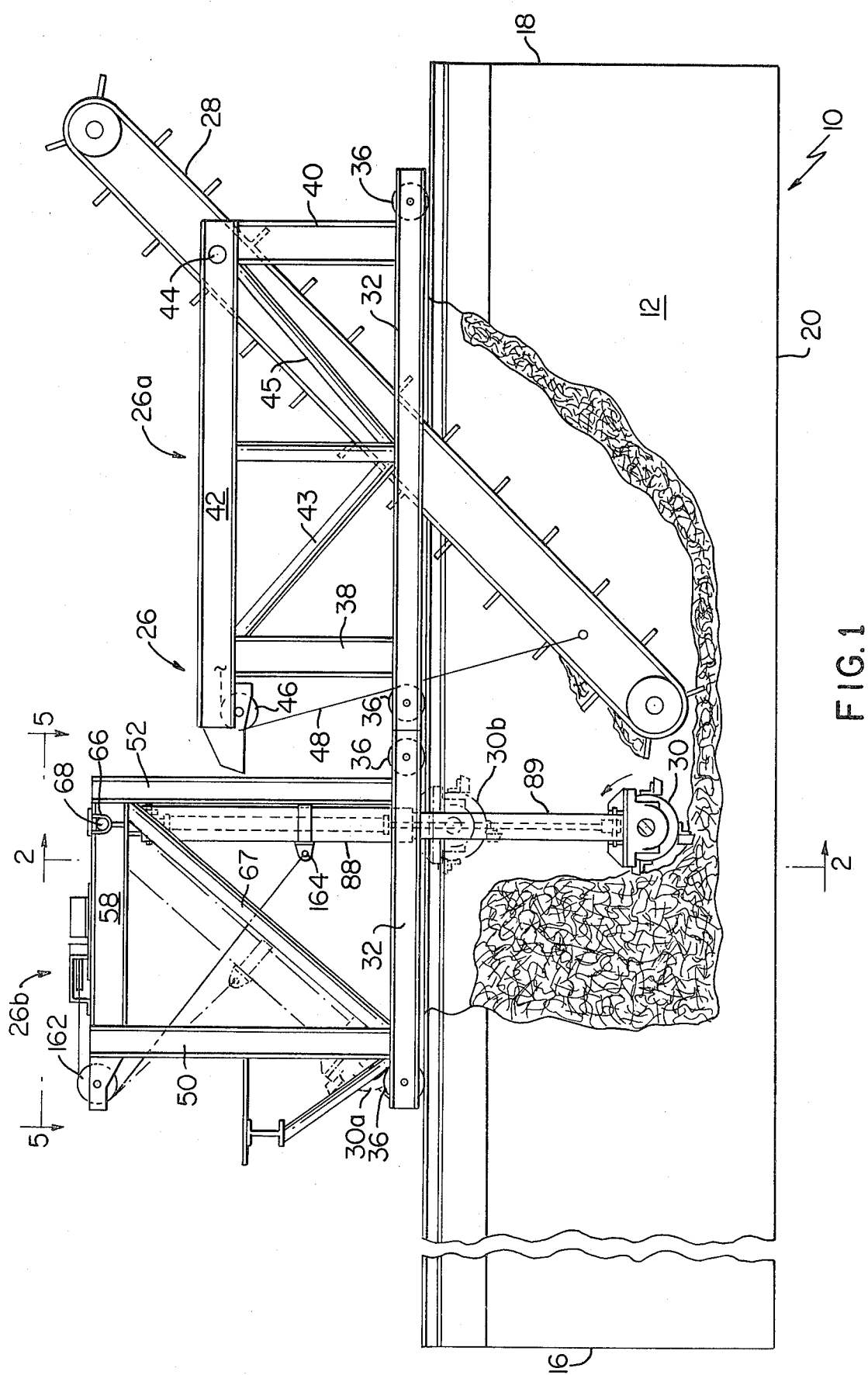
FIG. 1 is a side elevational view of a containment vessel containing organic material illustrating a rotary cutting assembly of the preferred embodiment and its relationship to both the transport means and the containment vessel.

Referring now to the drawings and to FIG. 1 in particular, an open top containment vessel 10 is shown, the containment vessel having a pair of spaced parallel sidewalls 12 and 14 (see FIG. 2) which are joined by a pair of spaced parallel end walls 16 and 18. The end walls 16 and 18 are perpendicular to the sidewalls 12 and 14. A bottom wall 20 joins the respective side and end walls and is in perpendicular relationship to both pairs of walls 12, 14 and 16, 18. Although not shown in the illustrations, the bottom wall has numerous perforations which provide air passages to a subjacent air space beneath the bottom wall 20. Details as to the structure of the perforations and the subjacent air space will be omitted herein in the interests of brevity. However, these details are described in U.S. Pat. No. 4,139,640, which patent is expressly incorporated herein by reference.

Figure 2:
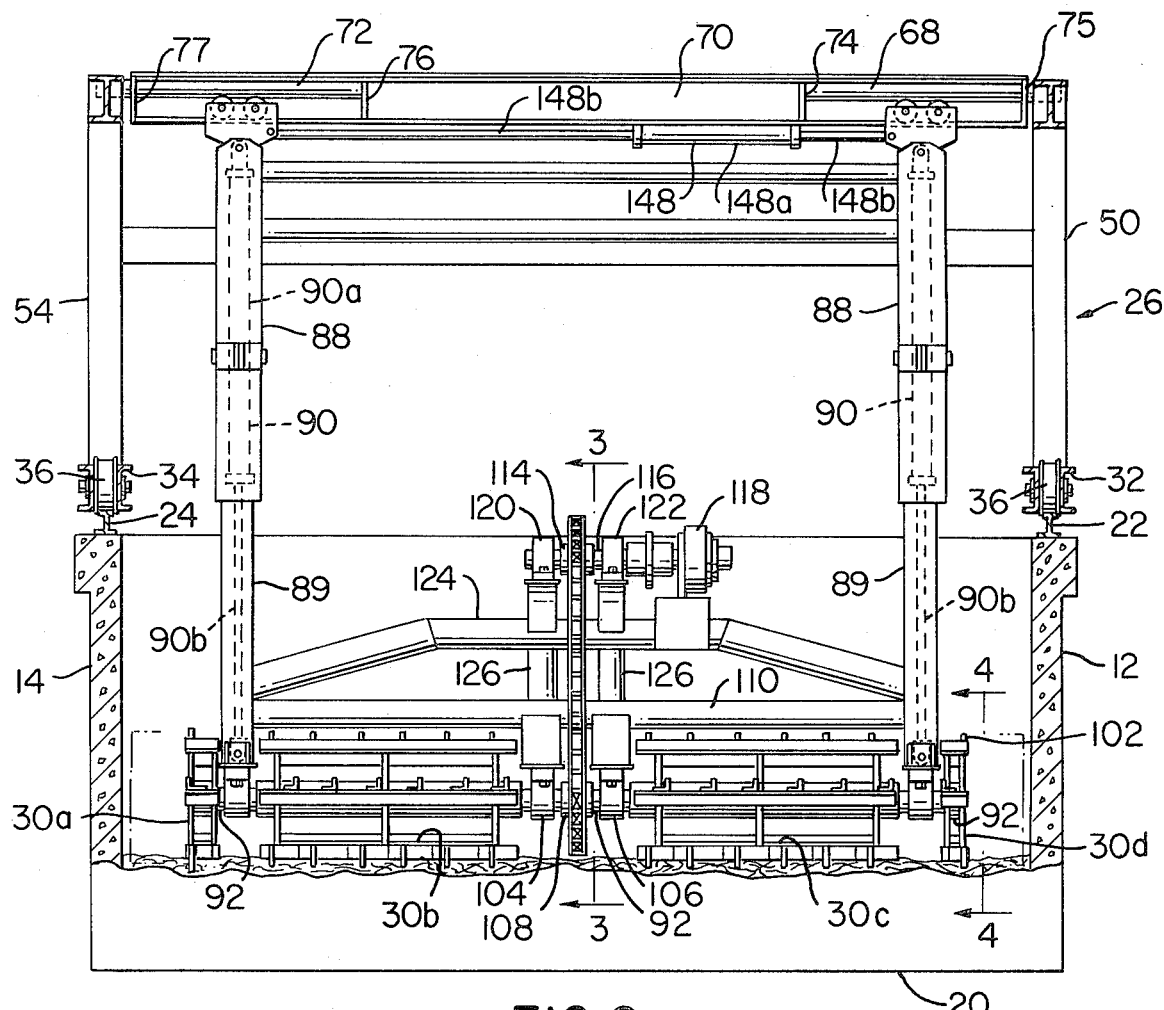
FIG. 2 is a cross sectional view taken along line 2—2 of FIG. 1 showing a carriage for the rotary cutting assembly and it's relationship to the containment vessel.

As perhaps seen more clearly in FIG. 2, rails 22 and 24 are mounted atop the sidewalls 12 and 14 and, as seen best in FIG. 1, run the entire longitudinal length of the sidewalls on the elongated vessel 10. These rails 22 and 24 serve as tracks for a carriage 26 which travels thereupon from one end of the elongate vessel 10 to the other. The carriage 26 carries both an endless conveyor 28 and an agitating mechanism in the form of a rotary breaker 30. The endless conveyor 28 and the rotary breaker 30 traverse the length of the containment vessel 10 in unison, both elements 28 and 30 being transported by the carriage 26.

The carriage 26 includes a pair of base channels 32 and 34 which are rollingly supported above and in generally parallel spaced relationship to the rails 22 and 24 respectively by a plurality of wheels individually and collectively identified by the numeral 36. The conveyor has a first section 26a (on the right side of the illustration of FIG. 1) which pivotally supports the endless conveyor 28 and a second section 26b (on the left side of the illustration of FIG. 1) which supports the rotary breaker 30.

The first carriage section 26a has a plurality of vertically extending support 38 and 40 extending from the base channel 32 and a non-illustrated pair of corresponding vertical supports extending vertically from base channel 34 in an identical manner. A horizontal channel 42 spans the vertical supports 38 and 40 in substantially parallel relationship with base channel 32 while a similar non-illustrated horizontal channel spans the non-illustrated vertical supports in a corresponding fashion above base channel 34. Obliquely oriented supports 43 and 45 also interconnect between the horizontal channel 42 and base channel 32. Similarly, non-illustrated supports extend between the base channel 34 and the non-illustrated horizontal channel in an identical manner. A pivot shaft 44 traverses the width of the containment vessel 10, between horizontal channel 42 and its non-illustrated counterpart above base channel 34, to pivotally support the endless conveyor 28 in a well known manner. The endless conveyor 28 is pivotally mounted to the first carriage section 26a at a location on the carriage proximal to one longitudinal end of the first section 26a (the right end in the illustration of FIG. 1). Proximal to the opposite end of the first carriage section 26a (the left end in the illustration of FIG. 1) is a rotatably supported pulley 46 which guides a cord 48 connected to the lower end of the endless conveyor 28. The opposite end of cord 48 (opposite the connection with conveyor 28) is connected to a hydraulic cylinder (not shown) whose movement serves to raise or lower the lower end of the endless conveyor 28.

Figure 5:
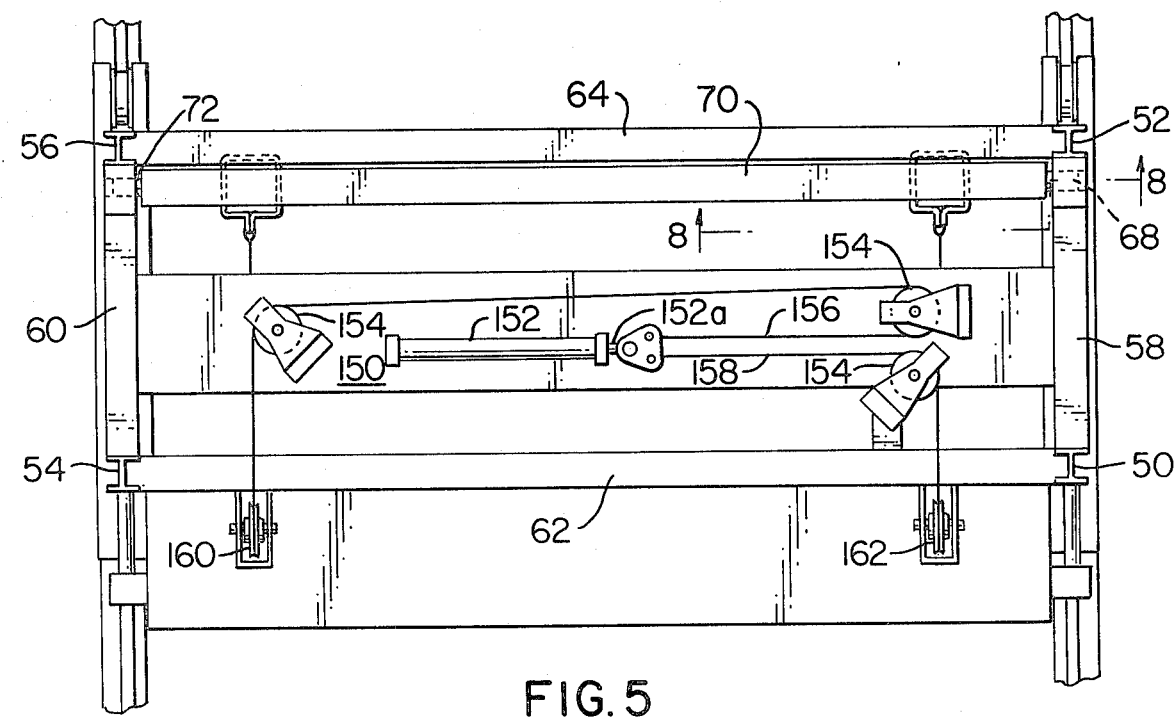
FIG. 5 is a plan view of the carriage depicted in FIGS. 1 and 2 taken along line 5—5 of the FIG. 1 depiction.

The second carriage section 26b also has a plurality of vertical supports extending upwardly from the base channels 32 and 34. FIG. 1 shows vertical supports 50 and 52 extending from base channel 32 and FIG. 2 shows vertical support 54 extending from base channel 34. A fourth vertical 56, while obscured in the illustrations of FIGS. 1 and 2, is depicted in FIG. 5. Horizontal supports join the ends of the vertical supports 50, 52, 54 and 56 distal to the base channels 32 and 34. Two of the horizontal supports 58, 60 are in general parallel relationship to the base channels 32 and 34 respectively, horizontal support 58 joining vertical supports 50 and 52 and horizontal support 60 joining vertical supports 54 and 56. Further horizontal supports 62 and 64 traverse the open containment vessel 10 and join vertical supports 50 and 54 and 52 and 56 respectively. Obliquely oriented supports, such as support 67 shown in FIG. 1, extend between the upper and lower ends of the vertical supports 50 and 52 as well as 54 and 56 to provide structural rigidity for the second carriage system.

Figure 8:
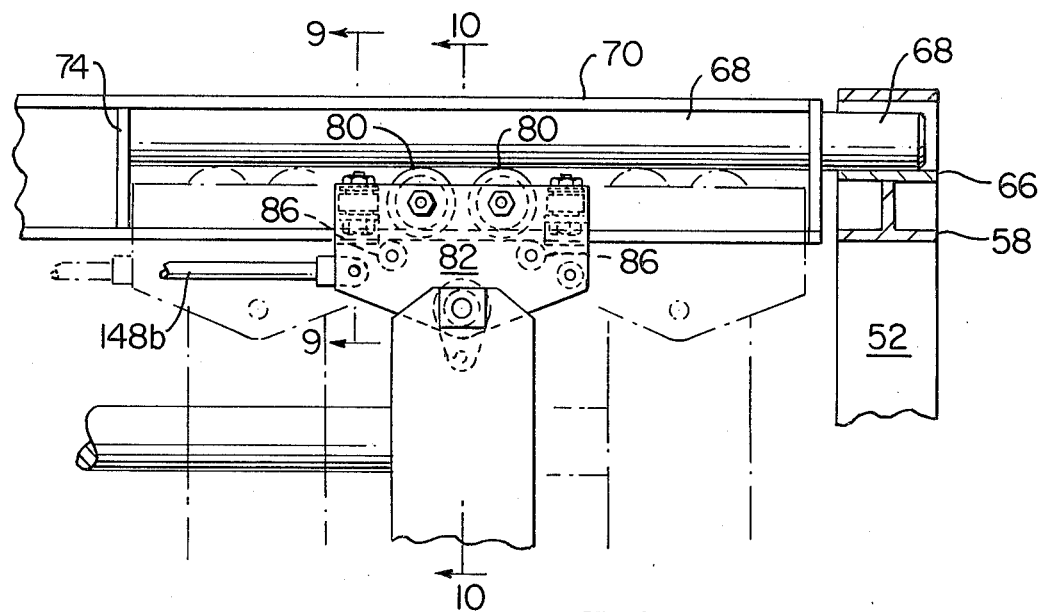
FIG. 8 is a somewhat enlarged sectional view taken along line 8—8 of FIG. 5 showing how agitator hanger rods supporting the rotary cutting assembly are mounted at the top of the carriage.

The second carriage section 26b provides a pivotal support for the rotary breaker 30. This support is focused at saddle 66 (see FIG. 1) fixed to the horizontal supports 58 and 60. FIG. 1 shows the saddle 66 fixed to the horizontal support 58 while FIGS. 2 and 5 jointly (although less clearly) depict a further saddle fixed to horizontal support 60. These saddles 66, which are U-shaped supports, nestingly receive a shaft 68. As seen more clearly in FIGS. 2, 5 and 8, the shaft 68 is, in turn, part of a swing bar 70. The swing bar 70 traverses the width of the containment vessel 10 and is pivotally swingable about shaft 68 and co-axial shaft 72 (see FIGS. 2 and 5) on the opposite side of the swing bar 70 which is nestingly received by the saddle support fixed to horizontal support 60. Both of the shafts 68 and 72 are rigidly secured to the central intermediate portion of the swing bar 70.

Figure 9:
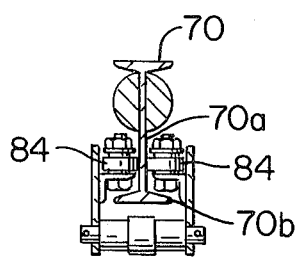
FIGS. 9 and 10 are sectional views taken along lines 9—9 and 10—10 of FIG. 8 respectively showing details of the mounting.
Figure 10:
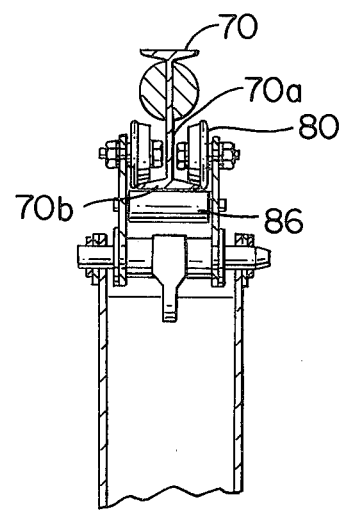

FIGS. 9 and 10 show that the swing bar 70 in the illustrated embodiment is an I-beam and that the shafts 68 and 72 are split semi-cylindrical sectors disposed upon opposite sides of the I-beam 70 and rigidly secured thereto. These shafts extend outwardly from end stops 74 and 76 (see FIGS. 2 and 8) positioned at predetermined fixed intermediate locations on the swing bar 70. As will be explained in greater detail later, these predetermined locations are selected to correspond to the desired transverse lateral travel of the rotary breaker 30 within the containment vessel 10.

As also shown in the illustrations of FIGS. 9 and 10, the split halves of the shafts 68 and 72 are disposed about the upper half of the I-beams's (70) central section 70a. This disposition permits the lower half of the central I-beam section 70a to be used as a track for the rotary breaker 30. The rotary breaker 30 is rollably mounted upon lower flanges 70b of the swing bar 70 through the agency of a plurality of rollers or wheels 80. As seen in FIG. 10, these wheels 80 are on both sides of the I-beam 70 and are, in turn, rotatably connected to a traveling bracket 82. The rotary breaker's (30) weight is predominantly supported by the interface force between the wheels 80 and the swing bar's lower flange 70b. Horizontal guide rollers 84, shown in FIG. 9, are also rotatably mounted to the traveling bracket 82 on opposite sides of the swing bar 70 and adapted to rollingly engage with the swing bar's central section 70a as the bracket 82 is transversely moved with respect to the swing bar 70. These horizontal guide rollers 84 reduce relative lateral shifting between rotary breaker 30 and the swing bar 70 (from left to right in FIG. 1, for example). Similarly, a pair of vertical guide rollers 86 are adapted to rollingly engage the lower surface of flange 70b and to reduce relative vertical shifting between the rotary breaker and the swing bar 70. One of these vertical guide rollers 86 is depicted in FIG. 10.

Extending downwardly from the traveling brackets and secured thereto are a pair of primary cylindrical hangers 88 (see FIGS. 1 and 2). Concentric with and disposed within these cylindrical hangers are a pair of secondary cylindrical hangers 89, one secondary hanger 89 being movably disposed within each of the primary hangers 88. The lower vertical terminus of each of the secondary hangers 89 extends beyond the corresponding vertical terminus of the primary hanger 88 and the secondary hangers 89 have an external diametral dimension which is less than the internal diametral dimension of the primary hanger 88. Furthermore, each of the secondary hangers 89 is longitudinally translatable within one of the primary hangers 88 in a telescoping fashion. This longitudinal translation is effectuated by a pair of hydraulic piston cylinder arrangements 90. As shown both in FIG. 1 and FIG. 2, each of the cylinders 90a is securely fastened to one of the primary cylindrical hangers 88 while the associated piston rod 90b is secured fastened to the secondary cylindrical hanger 89. As should be readily apparent to those skilled in the art, extension and retraction of the piston cylinder arrangements 90 effectuate the longitudinal translation between the primary and secondary cylindrical hangers discussed above. Moreover, this relative translation between the primary and secondary hangers raises and lowers the rotary breaker 30.

Figure 4:
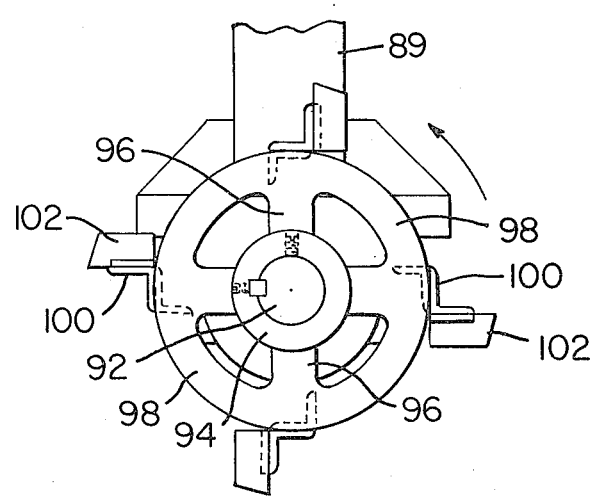
FIG. 4 is a sectional view taken along line 4—4 of FIG. 2 showing an end view of the rotary cutting assembly of FIGS. 1 and 2 illustrating an end disc section.

The rotary breaker, as perhaps best illustrated in FIG. 2, includes four distinct sections 30a, 30b, 30c and 30d secured to a common rotary shaft 92. The outermost sections of the rotary breaker are disposed on opposite ends of a rotary shaft 92 and are specifically illustrated as disks 30a and 30d. These disk sections are similar and are exemplified by disk 30d, the end view of which is shown in FIG. 4. The disk 30d includes a central hub 94 which is keyed to rotary shaft 92. Radially extending from the central hub 94 are a plurality of spokes 96 which are joined at their radially outermost extremities by an outer hub 98. Fastened to the outer hub's external periphery at selected angular intervals are angle bars 100. Cutting knives 102 are secured to the angle bars by appropriate, but non-illustrated, fastening means, such as, for example, nuts and bolts. Disk 30a is similarly constructed.

Figure 6:
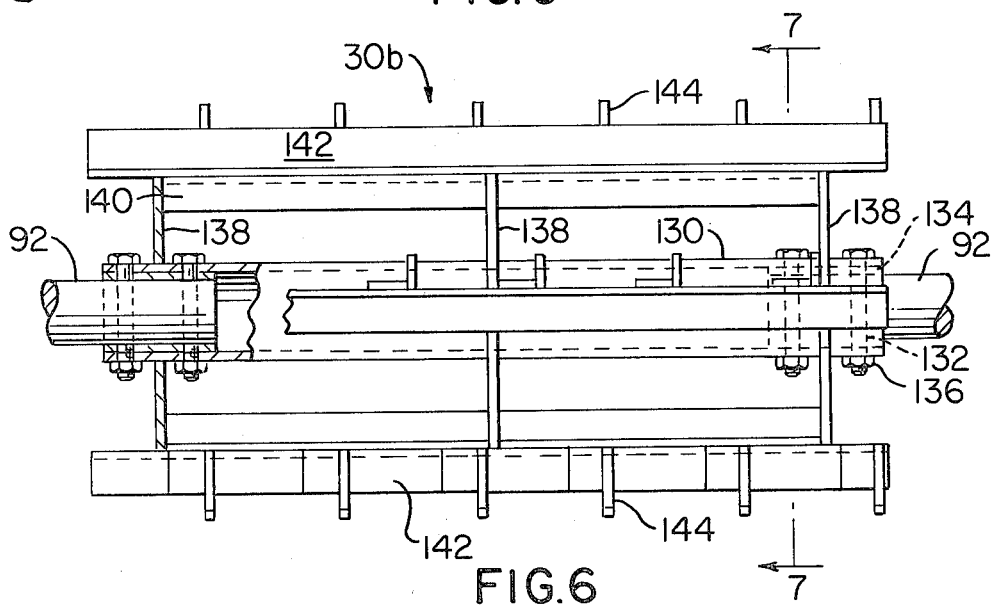
FIG. 6 is a somewhat enlarged view of a rotor and cutting knives of the rotary cutting assembly.

The rotary shaft 92 is supported by bearings which are carried by the secondary hangers 89. These bearing supports are interposed between the sections 30a and 30b on one axial side of the rotary shaft 92 and between sections 30c and 30d on the opposite axial side. As shown in FIG. 6, the rotary shaft 92 is segmented. However, each of the rotary shaft 92 segments are co-axial and function as a single unitary shaft.

Further bearing supports 104 and 106 (see FIG. 2) for the rotary shaft 92 are interposed between the sections 30b and 30c of the rotary breaker and are disposed on opposite axial sides of a centrally located drive sprocket 108 which is also keyed to rotary shaft 92. These further bearing supports 104 and 106 are, in turn, supported upon a support member 110 which extends between the secondary hangers 89 proximal to the rotary breaker 30.

Figure 3:
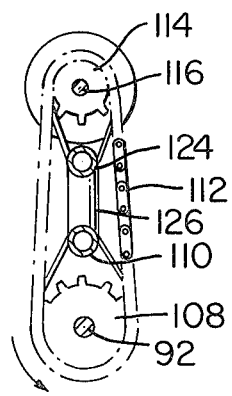
FIG. 3 is a cross sectional view taken along line 3—3 of FIG. 2 illustrating a drive mechanism for transmitting rotary power between a drive unit and the rotary cutting assembly.

The drive sprocket 108 is driven by a link chain 112 depicted most clearly in FIG. 3. This chain 112 is driven by a driving sprocket 114 keyed to a driving shaft 116 of a motor 118. The shaft 116 is supported by bearings 120 and 122 (FIG. 2) positioned adjacent to and on opposite sides of the driving sprocket 114. Mounts for the bearings 120 and 122 as well as the mount for motor 118 are supported upon an angled support member 124 which also extends between and is rigidly secured to each of the secondary hangers 89. A pair of tubular interconnecting supports 126 rigidly secure the angled tubular support member 124 to the tubular support member 110.

Figure 7:
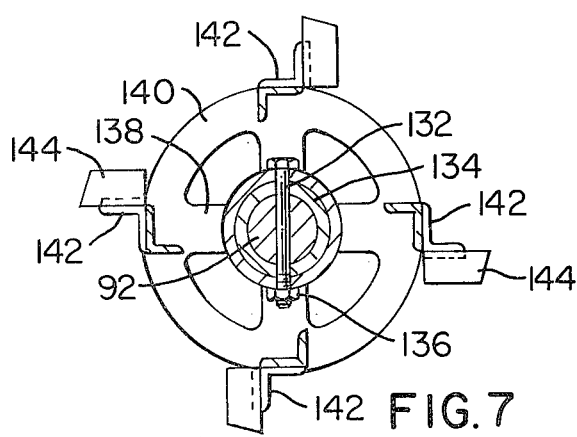
FIG. 7 is a sectional view taken along line 7—7 of FIG. 6 showing the rotor secured to a driven shaft.

FIG. 6 shows a somewhat enlarged depiction of the rotary section 30b. The section 30b is identical to section 30c. Hence, only one of these sections will be specifically described. Like the end disks 30a and 30d, section 30b has a central hub 130. This hub 130 has a cylindrical configuration. It is joined on each of its axial end portions by segments of the rotary shaft 92. This interconnection with the segments of shaft 92 is by virtue of bolts 132 which extend through aligned apertures in the central hub 130, rotary shaft 92 and an interposed sleeve 134. The bolts 132 are secured in these aligned apertures by nuts 136 which are threadably received on the threaded end of the bolt 132 to hold the shaft 92 and central hub 130, as well as the interposed sleeve 134, in fixed positions relative to each other. The central hub 130 has a plurality of sets (three in the illustrated embodiment) of radially extending spokes 138 which rigidly support an outer hub 140. This outer hub 140 supports, in turn, a plurality of angle bars 142 at predetermined angular intervals on its external surface. Cutting knives 144 are fastened to each of the angle bars at predetermined axial spacings along the section's (30b) length. In the illustration of FIGS. 6 and 7, six cutting knives 144 are fastened to each of the four angle bars 142 along the bar's (142) length.

As suggested above, the rotary breaker 30 is transversely movable from one side of the containment vessel 10 to the other and back again. This movement is effectuated by a double rod piston cylinder arrangement 148 (see FIGS. 2 and 8). This arrangement 148 has a cylinder 148a secured to the underside of swing bar 70. Piston rods 148b extend out of opposite ends of the cylinder 148a and are attached to brackets 82 on each side of the swing bar 70. These two piston rods act in unison if the cylinder arrangement 148 is activated and are operatively functional to transversely move the brackets 82, and thus ultimately the rotary breaker 30 axially relative to the swing bar 70.

Referring now to FIGS. 5 and 1, an arrangement for rotating the rotary breaker 30 about the axis of shaft 68 is shown. This arrangement includes a support plank 150 which spans the width of the containment vessel between horizontal supports 58 and 60 to provide a seat for a hydraulic cylinder 152 and a set of horizontal pulleys 154. The hydraulic cylinder 152 has a piston rod 152a which is fastened to a pair of cords 156 and 158. The cord 156 is directionally changed by two of the horizontal pulleys 154 and a vertical pulley 160 secured to cross support 62 which cord 158 is directly changed by one of the horizontal pulleys 154 and a vertical pulley 162 also secured to the same cross support 62. As seen most clearly in FIG. 1, after passing about the vertical pulley 162, the cord 158 is connected to an eyelet 164 which is wrapped about one of the primary hangers 88. Cord 156 is similarly attached to an identical eyelet wrapped about the other primary hanger 88. It is thus seen that hydraulic cylinder 152 may be used to effectuate rotation of entire rotary breaker 30 about the common axis of shafts 68 and 72. Rotation of the entire rotary breaker 30 in this manner would move the rotary breaker 30 to a non-operative transport positon shown in phantom and identified by the numeral 30a.

In operation, individual charges of undecomposed organic material are introduced into the left hand side (as shown in FIG. 1) of the containment vessel 10 of the preferred embodiment. The containment vessel 10 of the preferred embodiment is approximately twenty feet in width and an initial charge would normally extend lengthwise in the containment vessel 10 for a distance between 125 and 200 feet at a depth between 8 and 12 feet. This charge of organic waste material is permitted to remain at this initial location in a quiescent condition until it reaches a predetermined thermophilic temperature of approximately 140° F.

After reaching this predetermined temperature, the charge is advanced to a second station or position in the vessel 10 by the rotary breaker 30 and endless conveyor 28 described above. The rotary breaker 30 is transported to a position above the right hand end of the charge by the carriage 26. Prior to the carriage 26 being so positioned, the secondary hangers 89 will have been retracted within the primary hangers 88 to lift the rotary breaker 30 to the position illustrated in phantom lines identified as 30b in FIG. 1. With the carriage 26 at rest, hydraulic cylinders 90 are activated to drop the rotary breaker 30 downwardly into the right hand end (as shown in FIG. 1) of the accumulated change of organic material. As the rotary breaker 30 is dropped, it cuts the face of the change and mixes the material, both with itself and with the surrounding air. The endless conveyor 28 is proximally located to the rotary breaker 30 and receives the organic material discharged therefrom after the organic material has been cut and intermixed. This intermixed organic material received from the rotary breaker 30 is then transported to a second station or position in the vessel 10 located to the right (in FIG. 1) of its previous location.

As the rotary breaker 30 is being lowered from the phantom line position identified as 30b to the position illustrated in full lines in FIG. 1 and identified by the numeral 30, it is also being simultaneously moved transversely from one side of the containment vessel 10 to the other under the impetus of hydraulic cylinder 148. This simultaneous transverse movement is possible because the brackets 82 are rollingly carried upon the swing bar 70 by wheels 80. This transverse movement also moves the side disks 30a and 30d into close proximity with the side walls 12 and 14 and insures that the organic material will be cut in the area reserved for the bearings supporting rotary shaft 92. Transverse movement of the rotary breaker 30 is limited by the end stops 74, 75, 76 and 77. For example, as illustrated in FIG. 2, end stops 77 and 74 limit the leftward movement of rotary breaker 30 as they abut the left and right brackets 82 respectively and end stops 76 and 75 limit rightward movement of the rotary breaker 30 by abutting the opposite sides of these same brackets 82.

After the rotary cutter 30 reaches the bottom of the containment vessel 10, it is once again retracted and the carriage 26 is moved leftwardly (as illustrated in FIG. 1) and the process is repeated once again. Most preferably, the carriage is moved leftwardly by an amount equal to the radius of the rotary cutting assembly 30. This leftward movement repositions the rotary cutting assembly above the newly formed edge of the organic waste material.

The use of a cutter in this manner has multiple advantages. Firstly, the cutter, unlike many of the prior art devices for this purpose, is cutting the charge of organic waste material from top to bottom. Hence, it is never subjected to compressive forces caused by the weight of accumulated organic material. Secondly, this type of cutting and transfer of the organic material to the endless conveyor 28 increases the aeration of the organic material. In this regard, it is noted that substantial aeration occurs during the transfer as the rotary force imparted to the material by the rotary breaker 30 momentarily lifts the material in air-born suspension prior to deposit upon the endless conveyor 30. Also, in this regard, it is noted that the process for which the previously described rotary breaker and transport conveyor is designed utilizes aerobic bacteria which requires air.

Thus it is apparent that there has been provided, in accordance with the invention, a method and apparatus that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. An apparatus for intermixing material, comprising:
    (a) an open topped vessel for housing material;
    (b) a carriage extending across the top of the vessel from one side to the other, said carriage being longitudinally movable upon the vessel from one end to the other;
    (c) a rotary cutting assembly rotatably carried by said carriage, said cutting assembly being vertically movable within the vessel during rotation of said cutting assembly, said cutting assembly serving to agitate and discharge material accumulated in said vessel; and
    (d) transport means proximately located with respect to said cutting assembly for receiving material discharged therefrom.

2. An apparatus as recited in claim 1 wherein said rotary cutting assembly is oscillated from one side of the vessel to the other.

3. An apparatus as recited in claim 2 wherein said rotary cutting assembly is oscillated from one side of the vessel to the other simultaneously with being moved vertically to agitate and discharge the accumulated material.

4. An apparatus as recited in claim 3 wherein said rotary cutting assembly is hangingly suspended from a support spanning the width of the open topped vessel from one side to the other.

5. An apparatus as recited in claim 4 wherein at least one piston cylinder arrangement is used to vertically raise and lower the rotary cutting assembly within the containment vessel.

6. An apparatus as recited in claim 5 wherein said rotary cutting assembly is suspended from said support spanning the width of the vessel by a pair of telescoping hangers, said telescoping hangers being longitudinally translatable with respect to each other in accordance to a pair of piston-cylinder arrangements disposed therein.

7. An apparatus as recited in claim 6 wherein said hangers are movably supported upon said support spanning the width of the open topped vessel.

8. An apparatus as recited in claim 7 wherein said piston cylinder arrangement is secured to said support spanning the width of the vessel and said hangers, said piston cylinder arrangement being operative to move said hangers along said spanning support transversely with respect to said vessel.

9. An apparatus as recited in claim 8 wherein said hangers are rollingly supported upon said spanning support and rollable thereupon.

10. An apparatus as recited in claim 9 wherein each of said telescoping hangers includes a primary hanger and a secondary hanger longitudinally translatable within said primary hanger, said rotary cutting assemby being rotatably secured to said secondary hangers.

11. An apparatus as recited in claim 10 further including a motor drive mounted upon a support secured to each of said secondary hangers, said motor drive being operative to rotatably drive said rotary cutting assembly.

12. An apparatus as recited in claim 11 wherein said rotary cutting assembly includes a drive sprocket driven by said motor drive, said drive sprocket being centrally disposed upon a driven shaft which rotates the rotary cutting assembly, said cutting assembly having cutting surfaces.

13. An apparatus as recited in claim 12 wherein said rotary cutting assembly includes at least four distinct cutting sections, at least one of the distinct cutting sections being disposed on said driven shaft between sidewalls of the vessel and the hangers and at least two of the distinct sections being disposed between the hangers.

14. An apparatus as recited in claim 13 wherein said transport means is an endless conveyor.

15. An apparatus as recited in claim 14 wherein said transport means is mounted upon a carriage longitudinally movable upon the container from one end to the other in tandem with said rotary cutting assembly.

16. An apparatus as recited in claim 15 wherein said rotary cutting assembly includes a hub rigidly affixed to and rotatable with said rotary shaft and a plurality of cutting knives disposed upon the periphery of said hub.

17. An apparatus for agitating and intermixing accumulated organic waste material, comprising:
    (a) an open top vessel for housing organic waste material, said vessel having a bottom, two sidewalls and two end walls;
    (b) a pair of tracks extending along the vessel longitudinal length, said tracks being positioned atop the sidewalls of the vessel with one track being positioned upon each sidewall;

(c) a carriage longitudinally movable along said tracks, said carriage spanning the distance between the sidewalls;

(d) a rotary cutting assembly carried by said carriage, said rotary cutting assembly being supported by a hanger which vertically raises and lowers the rotary cutting assembly, said hanger being reciprocally movable with respect to said carriage from side to side of said vessel simultaneously with the vertical movement of said rotary cutting assembly with respect to said vessel, said rotary cutting assembly being operative to intermix accumulated organic material and to discharge the intermixed material; and (e) an endless conveyor proximally located with respect to said rotary cutting assembly, said endless conveyor being adapted to receive material discharged from said rotary cutting assembly and to transport said material to a predetermined location.

18. A method of intermixing an accumulated quantity of organic waste material, comprising:

(a) accumulating a quantity of organic waste material in a vessel;

(b) positioning a rotary cutting assembly above one end of the accumulated organic waste material;

(c) vertically advancing the rotary cutting assembly downwardly into the edge of the accumulated organic waste material to cause the edge portion of the organic waste material to separate from the remainder of the material, and discharging the separated material from the rotary cutting assembly to allow the separated edge portion of the accumulated material to intermix with ambient air; and (d) transporting the separated and intermixed material from the discharge location of the rotary cutting assembly to a separate and predetermined location.

19. A method as recited in claim 18 further including the steps of:

(i) moving the rotary cutting assembly toward the other end of the accumulated waste material and repositioning the rotary cutting assembly above the newly formed edge of the organic waste material; and (ii) repeating steps (c) and (d).

20. A method as recited in claim 19 wherein the rotary cutting assembly is moved toward the other end of the accumulated waste material by a distance equal to the radius of the rotary cutting assembly to reposition the rotary cutting assembly above the newly formed edge of the organic waste material.

21. A method as recited in claim 20 further including the step of transversely and reciprocally moving the rotary cutting assembly.

22. A method as recited in claim 21 wherein the transverse and reciprocal movement of the rotary cutting assembly is simultaneous with the vertical downward movement.

* * * * *